UNITED STATES PATENT OFFICE.

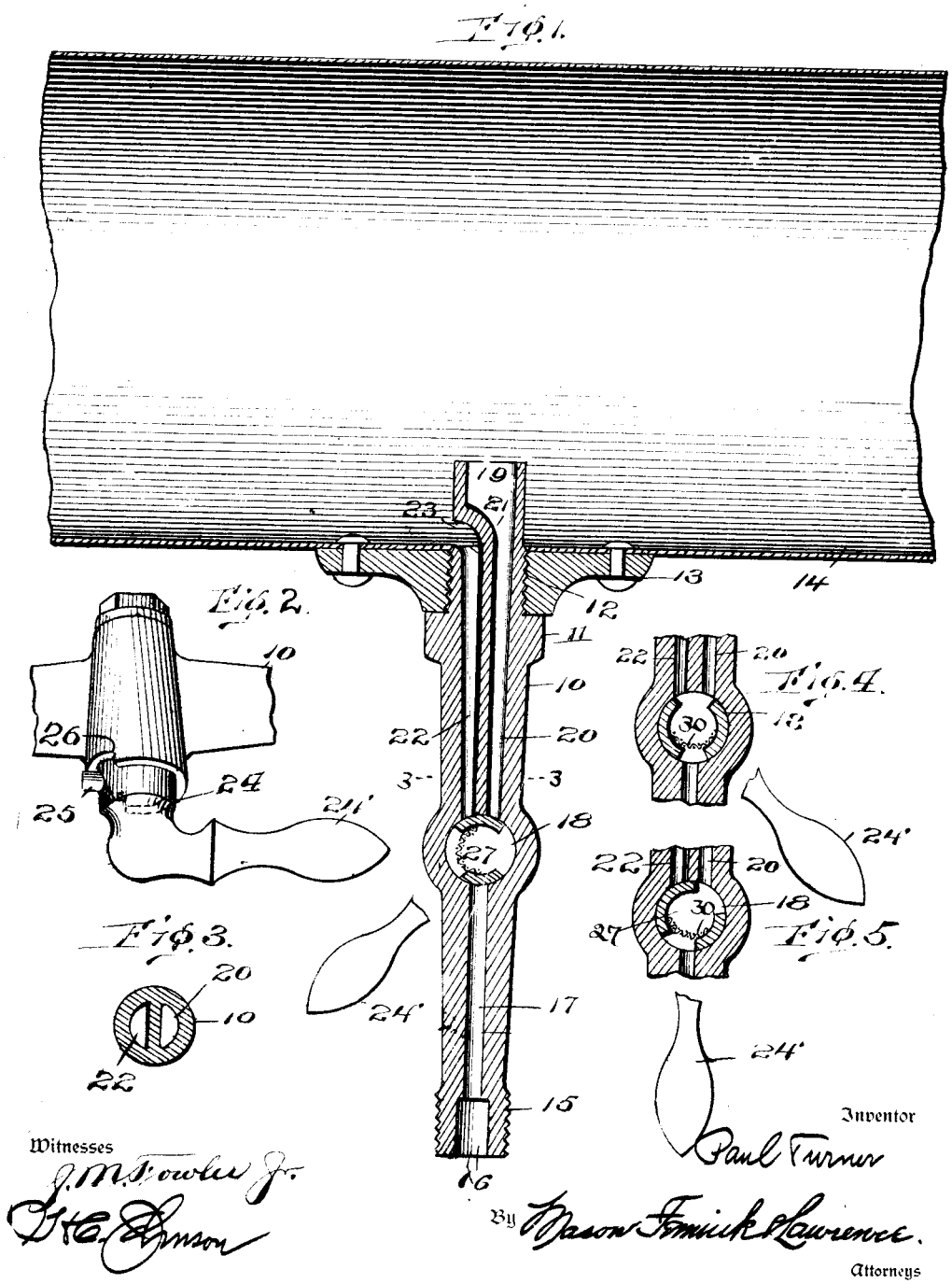

PAUL TURNER, OF McDONOUGH, GEORGIA.

VALVE FOR GASOLENE-TANKS.

1,050,181.    Specification of Letters Patent.    Patented Jan. 14, 1913.

Application filed March 8, 1911.  Serial No. 613,003.

*To all whom it may concern:*

Be it known that I, PAUL TURNER, a citizen of the United States, residing at McDonough, in the county of Henry and State of Georgia, have invented certain new and useful Improvements in Valves for Gasolene-Tanks; and I do hereby declare the following to be a full, clear, and exact description of the invention, such as will enable others skilled in the art to which it appertains to make and use the same.

This invention relates to valves for gasolene tanks and the object is to provide improved means whereby the individual driving a machine may be warned of the condition of the gasolene supply before the latter is exhausted.

A further object is to provide improved means for drawing off the gasolene at a given level, and above that level, the supply being cut off automatically when the liquid has fallen to the point named, and again tapped at a lower level by the manual operation of the supply valve.

A further object is to provide an improved valve casing having a plurality of inlets located at different levels within the gasolene tank, with means for controlling such inlets.

A further object is to provide such a valve casing with a central valve member for controlling both inlets, and a still further object is to provide a valve and a novel form of valve casing which may readily be applied to a gasolene tank by removing the valve ordinarily employed, without making structural changes of any kind.

In the accompanying drawings forming a part of this application Figure 1 is a view of a portion of a gasolene tank showing my improved valve applied thereto, the valve casing being in section. Fig. 2 is a detail view of the valve proper. Fig. 3 is a cross section of the valve casing on the line 3—3. Fig. 4 is a view of a portion of the casing in section showing the position of the valve. Fig. 5 is a similar view showing the valve in another position.

In carrying out my invention, I provide a valve casing 10 with an annular enlarged portion 11 and a screw threaded portion 12 arranged to have connection with a plate 13 secured to the wall 14 of a gasolene tank. Valve casing 10 has a lower threaded portion 15 adjacent to the lower end 16 of the outlet channel 17. Channel 17 extends lengthwise of the casing and centrally thereof and has communication with a valve chamber 18.

The opposite end of the valve casing 10 extends for a suitable distance into the gasolene tank and has a central bore 19. A channel 20 extends lengthwise of casing 10 and eccentrically thereof, and communicates with bore 19, at the point 21. A second inlet channel 22, also arranged eccentrically of casing 10 connects chamber 18 with an inlet 23 located in the outer side of the casing and on a level with the bottom of the tank.

A valve member 24, having a handle 24', is located within the chamber 18 and is provided with the usual stop 25 for engaging shoulders 26, in order to limit the movement of such member 24. The latter is provided with a transverse opening 27 extending entirely through the valve member and arranged to place in communication inlet channel 21 with outlet 17 or inlet 22 with outlet 17. A screen 30 in valve member 24 prevents the passage of dirt and the latter is readily removed by taking out member 24.

It will be understood that when the valve is in the position shown in Fig. 1 both inlet channels are cut off and no fuel is allowed to pass. Upon turning the valve to the position shown in Fig. 5 fuel will pass through inlet channel 20 and thence to outlet 17. As long as the valve remains in this position the supply of gasolene will continue until the level reaches the upper end of valve casing 10, and the flow will then immediately cease, warning the individual operating the machine that the supply is getting low. The valve may then be turned to the position shown in Fig. 4, for the purpose of permitting fuel to flow through inlet 23 channel 22 and thence to outlet 17.

I do not wish to be limited to the exact construction shown and described but may make such changes, alterations or additions as fall within the scope of the appended claim.

What I claim and desire to secure by Letters Patent is:

In a device of the class described, a valve member and a casing therefor comprising a member having a bore extending transversely thereof and intermediate of its ends and having a longitudinal bore extending from the transverse bore to one end of said member, a second longitudinal bore extending from the transverse bore toward the opposite end, a partition wall extending through the second longitudinal bore and dividing the same into a plurality of passages, one of which is enlarged toward the outer end, said partition wall being deflected over the other passage to form the enlarged portion, an aperture being formed in the side wall of the bored member, and the deflected portion extending to a point adjacent the aperture.

In testimony whereof I affix my signature in presence of two witnesses.

PAUL TURNER.

Witnesses:
JOHN L. FLETCHER,
H. C. JOHNSON.